United States Patent
Yamasaki et al.

(10) Patent No.: US 9,076,494 B2
(45) Date of Patent: Jul. 7, 2015

(54) OPTICAL PICK UP INCLUDING PROTRUSION PORTION TO POSITION OPTICAL ELEMENT

(71) Applicant: Hitachi Media Electronics Co., Ltd., Yokohama-shi, Kanagawa (JP)

(72) Inventors: Tatsuya Yamasaki, Tokyo (JP); Kenji Kiya, Yokohama (JP); Katsuhiko Kimura, Tokyo (JP)

(73) Assignee: HITACHI MEDIA ELECTRONICS CO., LTD., Kanagawa (JP)

( * ) Notice: Subject to any disclaimer, the term of this patent is extended or adjusted under 35 U.S.C. 154(b) by 0 days.

(21) Appl. No.: 14/044,486

(22) Filed: Oct. 2, 2013

(65) Prior Publication Data

US 2014/0101678 A1     Apr. 10, 2014

(30) Foreign Application Priority Data

Oct. 5, 2012 (JP) ................. 2012-222643

(51) Int. Cl.
| | |
|---|---|
| *G11B 7/00* | (2006.01) |
| *G11B 21/22* | (2006.01) |
| *G11B 7/22* | (2006.01) |
| *G11B 7/135* | (2012.01) |

(52) U.S. Cl.
CPC ........ *G11B 21/22* (2013.01); *G11B 7/22* (2013.01); *G11B 7/135* (2013.01)

(58) Field of Classification Search
CPC .......... G11B 7/125; G11B 21/22; G11B 7/22; G11B 7/135; A01B 12/006
USPC ................................. 720/672–688
See application file for complete search history.

(56) References Cited

U.S. PATENT DOCUMENTS 7,379,397 B2 *  5/2008  Mori et al. ................. 369/44.15

FOREIGN PATENT DOCUMENTS

JP          2004220637 A      8/2004

* cited by examiner

*Primary Examiner* — Gustavo Polo
(74) *Attorney, Agent, or Firm* — Volpe and Koenig, P.C.

(57) ABSTRACT

An optical pickup, including a housing, and an optical element mounted on the housing, wherein the optical element is fixed onto wall surfaces of the housing via adhesive agents on both sides of a certain single surface of the optical element, the optical pickup, further including a protrusion portion on the other side of a surface with the optical element positioned therebetween, the surface being orthogonal to the wall surfaces of the housing, the protrusion portion protruding from the housing, the front end of the protrusion portion protruding than the adhesive agents in a direction away from the wall surfaces.

5 Claims, 6 Drawing Sheets

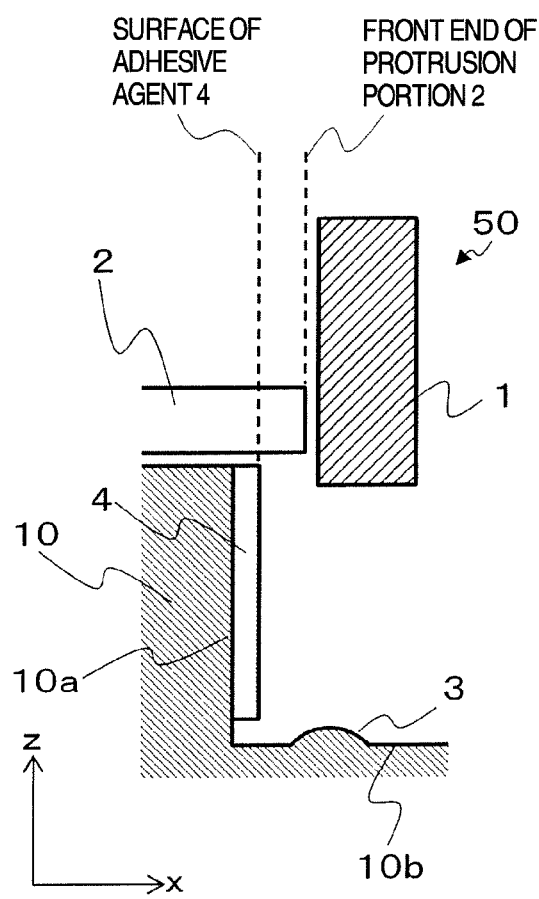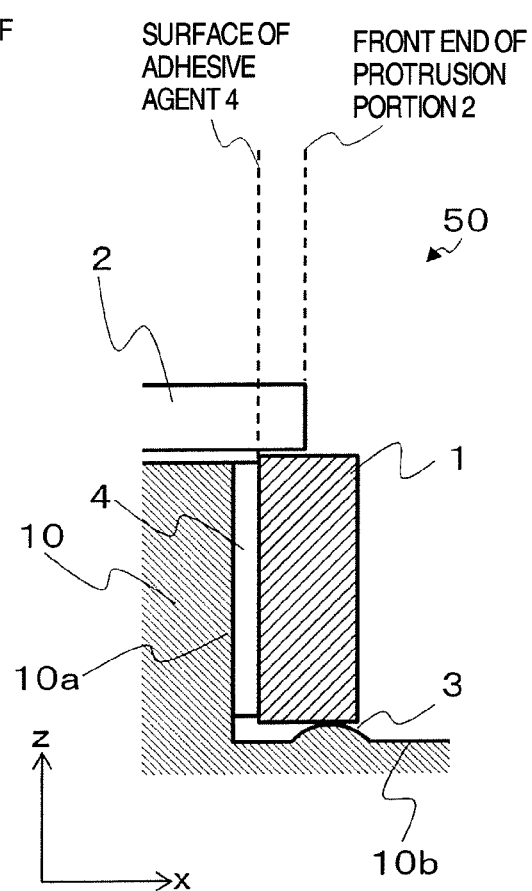

C-C CROSS SECTION

D-D CROSS SECTION

OPTICAL PICK UP INCLUDING PROTRUSION PORTION TO POSITION OPTICAL ELEMENT

BACKGROUND OF THE INVENTION

The present invention relates to an optical pickup that is used for an optical disc device for reproducing or recording information on the recording surface of an optical disc.

An optical pickup is a device for focusing laser light onto the recording surface of an optical disc, and detecting the laser light reflected from the recording surface of the optical disc. The optical pickup is constituted from a combination of optical elements such as a laser light-source, a mirror, a lens, and an optical detector.

An optical element is fixed onto the housing of the optical pickup with the use of an adhesive agent. In the adhesive-agent-used fixing, unlike the screw-used fixing, there exists no necessity for providing a space where the screw-fastening portion is to be formed. Accordingly, the adhesive-agent-used fixing is suitable for the fixing of small components like the optical elements.

Because of a lapse of time and a change in environmental temperature, however, the adhesive agent is caused to give rise to the occurrence of phenomena such as its hardening, shrinking, and expansion. Moreover, these phenomena give rise to the occurrence of the position shift and angle shift of an optical element. If these shifts are caused to occur, an aberration is caused to occur on the spot of the laser light that is focused onto the recording surface of the optical disc. This occurrence of the aberration results in the occurrence of an inconvenience that it becomes difficult to perform the high-density recording. Consequently, in order to provide the high-reliability optical pickup, it becomes absolutely necessary to consider the following design and method: Namely, the design of an adhesion structure where the adhesive agent's characteristics are taken into consideration, and an adhesion method for implementing this adhesion structure with a high accuracy.

In JP-A-2004-220637, as a method for reducing the position shift of an optical element that is to be adhesively fixed, the disclosure has been made concerning the configuration that a wedge-form block and a guidance plane are used in the adhesion portion.

SUMMARY OF THE INVENTION

In the configuration disclosed in JP-A-2004-220637, when bringing in an optical element down to its adhesion position, there exists the following possibility: Namely, because of causes such as a shift of the holding position of the optical element, and a rattle of the jig used, the optical element is caused to be brought in along a route that is different from an intended bring-in route. This undesirable situation becomes the cause for the occurrences of a phenomenon that the adhesive agent painted in advance is whittled and dropped off, and a phenomenon that the adhesive agent adheres onto an unintended position. As a result, there exists the following possibility: Namely, these phenomena become variations in the adhesion state, thereby bringing about the occurrence of the position shift and angle shift of the optical element.

In order to solve the above-described problem, in the present invention, the configuration disclosed in the appended claims is employed. An example of this configuration is as follows: An optical pickup, including a housing, and an optical element mounted on the housing, wherein the optical element is fixed onto wall surfaces of the housing via adhesive agents on both sides of a certain single surface of the optical element, the optical pickup, further including a protrusion portion on the other side of a surface with the optical element positioned therebetween, the surface being orthogonal to the wall surfaces of the housing, the protrusion portion protruding from the housing, the front end of the protrusion portion protruding than the adhesive agents in a direction away from the wall surfaces.

According to the present invention, it is possible to implement the stable adhesion when an optical element is adhesively fixed onto the housing of the optical pickup. This stable adhesion is made possible, even if there exists a shift of the holding position of the optical element, or even if there exists a deviation of the bring-in route due to a rattle of the jig used.

The problems, configurations, and effects other than those described above will become apparent from the following explanation of embodiments.

BRIEF DESCRIPTION OF THE DRAWINGS

FIGS. 4A and 4B are side views where the optical-element holding unit 50 included in the optical pickup 100 according to the first embodiment is seen from the y direction;

DETAILED DESCRIPTION OF THE EMBODIMENT

Figure 1:
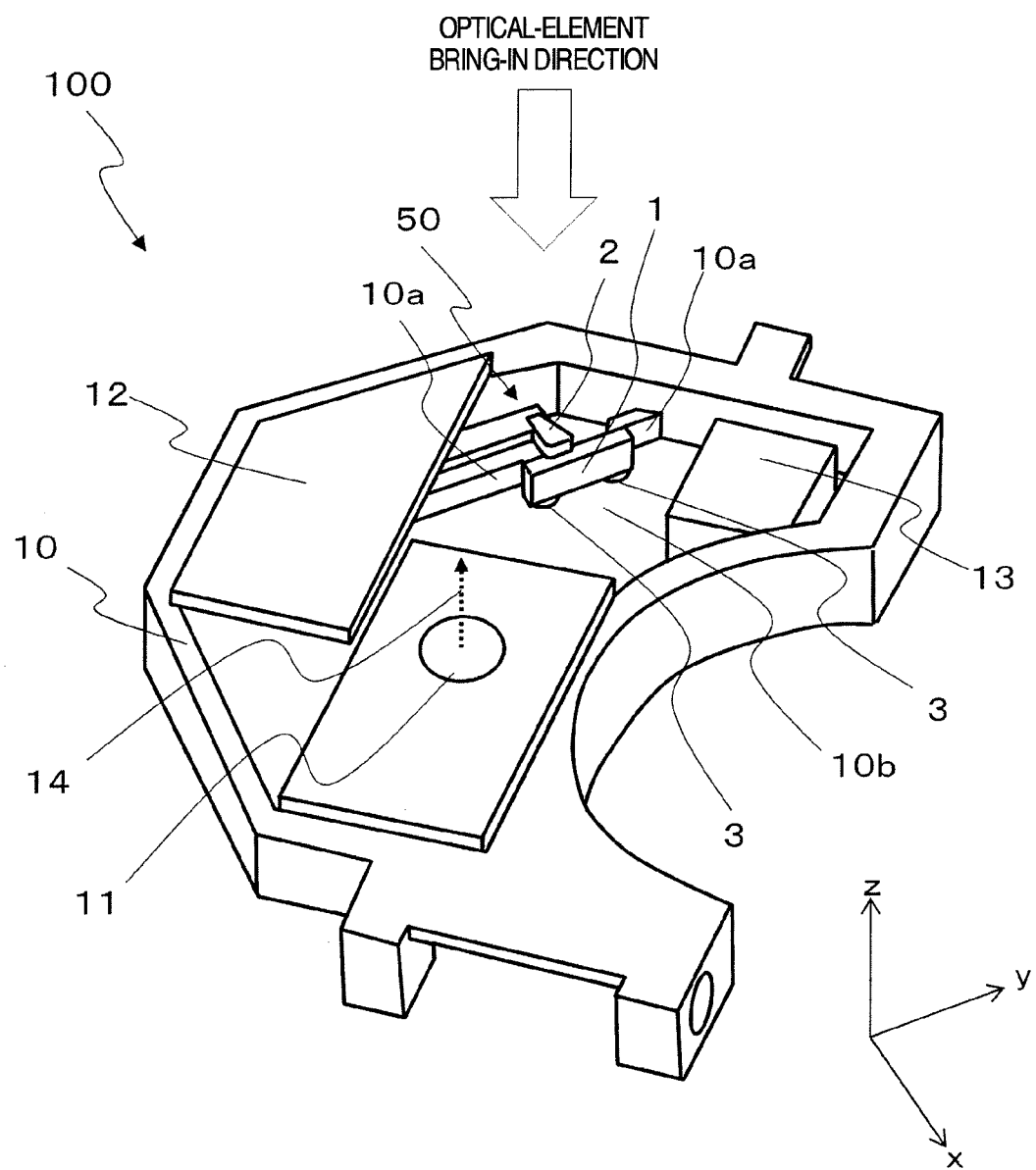
FIG. 1 is a bird's eye view of an optical pickup 100 according to a first embodiment.

Hereinafter, referring to the drawings, the explanation will be given below concerning embodiments of the present invention. Incidentally, configurations to which the same reference numeral is affixed are equipped with the same function. Accordingly, if the same reference numeral has been explained already, its explanation will be omitted in some cases.

First, referring to FIG. 1 to FIG. 6, the explanation will be given below concerning a first embodiment of an optical pickup of the present invention.

FIG. 1 is a bird's eye view of an optical pickup 100 according to the first embodiment.

The optical pickup 100 is constituted from configuration components such as a housing 10, an optical element 1 mounted thereon, the other optical components, an objective lens 11, an electronic substrate 12, and a laser light-source 13. The objective lens 11 focuses emitted laser light onto the recording surface of an optical disc. Here, the direction directing from the objective lens 11 to the not-illustrated optical disc is defined as an upper side; while its reverse side is defined as a lower side.

In general, the optical pickup 100 is of a shape that is flattened in the direction perpendicular to the optical axis 14 of the objective lens 11. The housing 10 is formed by the mold-formation of a plastic material. The housing 10 is also of the shape that is flattened in the direction perpendicular to the optical axis 14. Accordingly, when the housing 10 is formed by the mold-formation, punch-out is usually performed in the direction of the optical axis 14.

The optical element 1 is adhesively fixed onto wall surfaces 10a of the housing 10. When adhesively fixing the optical element 1, the wall surfaces 10a are coated with adhesive agents. After that, the optical element 1 is brought in from the upper side of the optical pickup 100 to the lower side thereof. At this time, in the structure of a comparison example, there exists the following possibility: Namely, if the wall surfaces 10a are substantially parallel to the bring-in direction, an adhesion failure is caused to occur at the adhesion steps of the optical element 1. The details of this possibility will be described later. Incidentally, in FIG. 1, a reference numeral 2 denotes a protrusion portion, reference numerals 3 denote position-determining convex portions, a reference numeral 10b denotes the bottom surface of the housing 10, and a reference numeral 50 denotes an optical-element holding unit 50.

Figure 2:
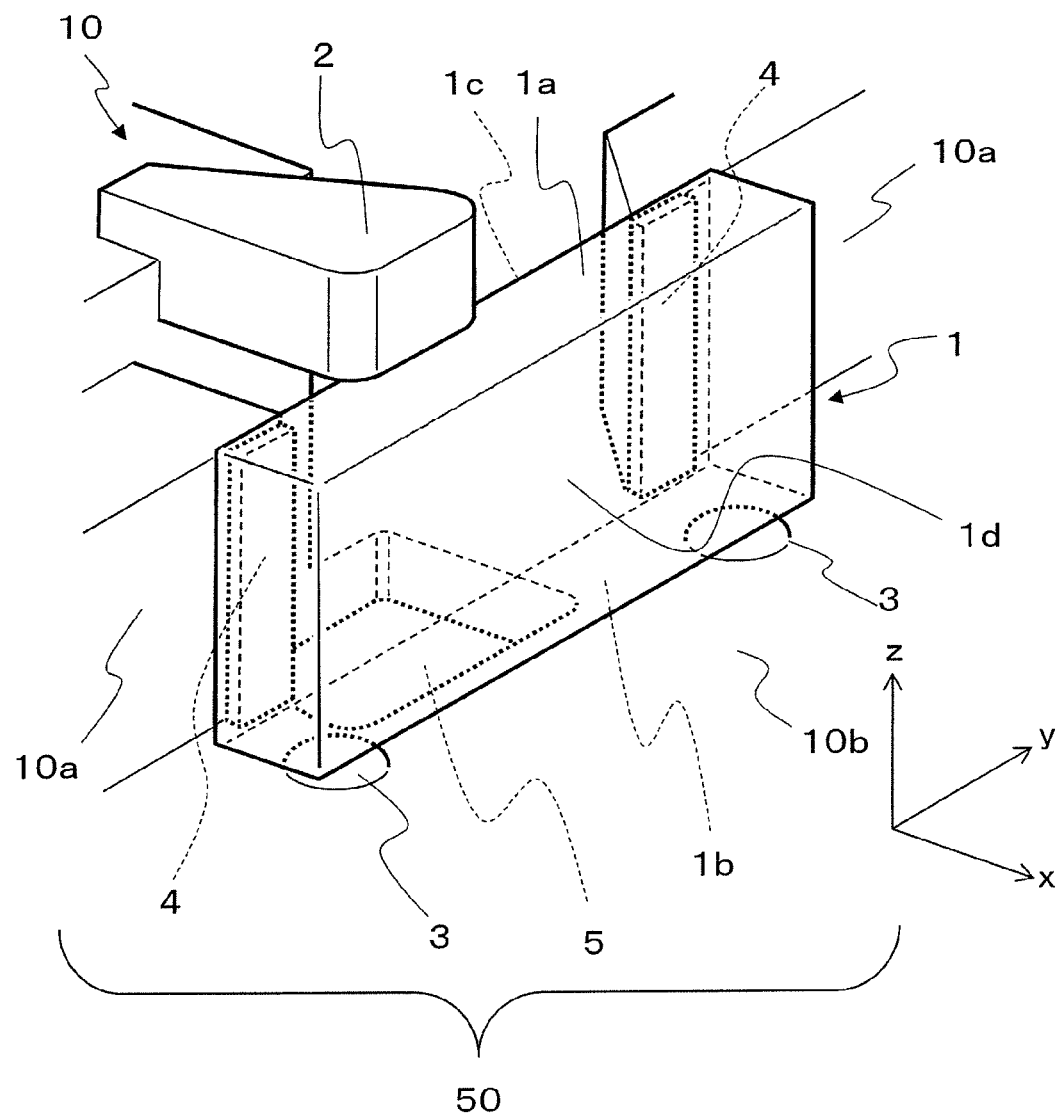
FIG. 2 is a perspective view for illustrating an optical-element holding unit 50 included in the optical pickup 100 according to the first embodiment.

FIG. 2 is a perspective view for illustrating the optical-element holding unit 50 that is included in the optical pickup 100 according to the present embodiment. The optical element 1 is a device that is formed of a glass or a transparent plastic material. For example, this optical element 1 is a half mirror for deflecting the optical path of the laser light by reflecting the laser light, or permitting the laser light to pass therethrough. Here, the laser light is emitted from the laser light-source 13 mounted on the optical pickup 100. The housing 10 is a component for holding the optical element 1 and the other configuration components. The housing 10 is formed by the mold-formation of a plastic material. The optical element 1 is adhesively fixed onto the wall surfaces 10a of the housing 10 via the adhesive agents. Also, the lower-side surface of the optical element 1 is in contact with the position-determining convex portions 3 that are formed on the bottom surface 10b, which is orthogonal to the wall surfaces 10a of the housing 10.

Here, the adhesion surface of the optical element 1 is defined as a back surface 1c. The surface on its opposite side is defined as a front surface 1d. The surface that is in contact with the position-determining convex portions 3 is defined as a lower surface 1b. The surface on its opposite side is defined as an upper surface 1a. Also, a xyz coordinate system is defined in accordance with the following manner: Namely, the direction directing from the lower surface 1b to the upper surface 1a is defined as the z direction, and the direction directing from the back surface 1c to the front surface 1d is defined as the x direction.

The feature of the present embodiment is as follows: Namely, the protrusion portion 2 that protrudes from the housing 10 is set up at a position which is opposed to the upper surface 1a of the optical element 1.

Next, referring to FIGS. 3A and 3B and FIGS. 4A and 4B, the explanation will be given below regarding the detailed configuration of the optical pickup according to the first embodiment, and a difference between this detailed configuration and the structure of the comparison embodiment.

Figure 3A:
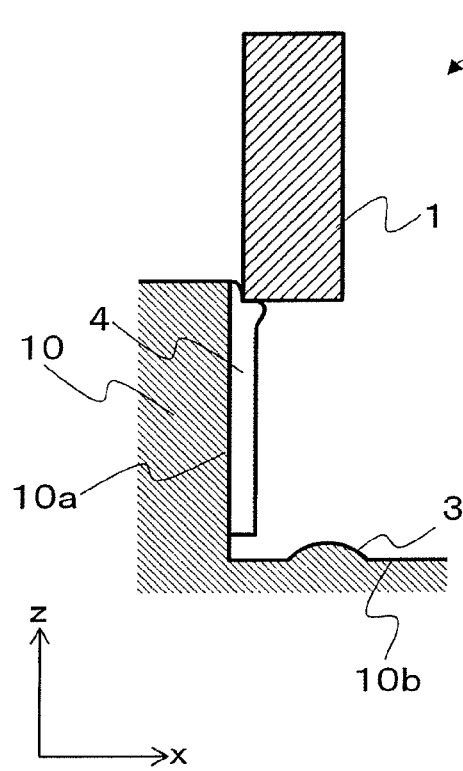
FIGS. 3A and 3B are side views where an optical-element holding unit 50' included in an optical pickup according to a comparison example is seen from the y direction.
Figure 3B:
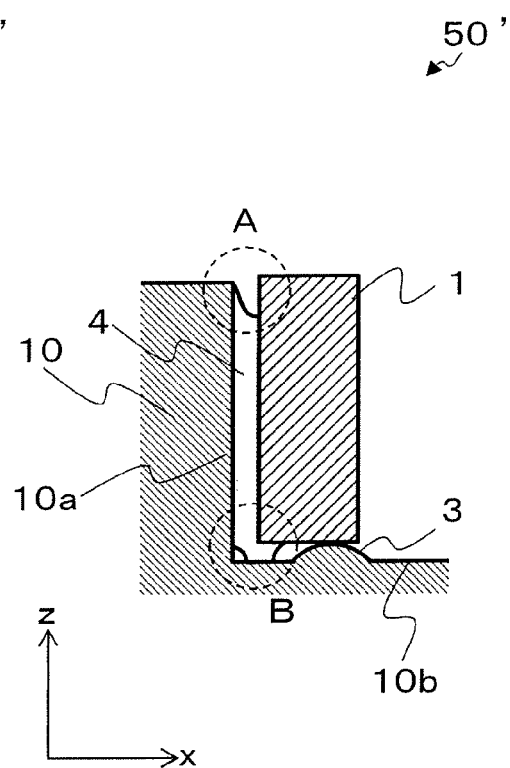

FIGS. 3A and 3B are side views where an optical-element holding unit 50' included in an optical pickup of the comparison example is seen from the y direction. FIGS. 4A and 4B are side views where the optical-element holding unit 50 included in the optical pickup according to the present embodiment is seen from the y direction. FIGS. 3A and 4A are the side views in a process where the optical element 1 is brought in down to the adhesion position. FIGS. 3B and 4B are the side views at a termination time of the adhesion steps.

When implementing the adhesion between the optical element 1 and the housing 10, first, the housing 10 is held with a fixing jig or the like. Then, the wall surfaces 10a of the housing 10 are coated with adhesive agents 4. Next, the optical element 1 is brought in down to the adhesion position by a manual operation or a bring-in jig, then being adhesively fixed onto the housing 10.

The z-direction position determination at the adhesion time is performed by pushing the optical element 1, and bringing the lower surface 1b of the optical element 1 into contact with the position-determining convex portions 3. Namely, when bringing in the optical element 1 down to the adhesion position, the following operations are performed: Namely, first, the optical element 1 is brought in down to a position where the lower surface 1b of the optical element 1 comes into contact with the position-determining convex portions 3. This bring-in operation is performed in a state where the optical element 1 is maintained to have a clearance with the adhesive agents 4 in the x direction. After that, the optical element 1 is displaced onto the side of the adhesive agents 4.

As long as the configuration is similar to the present structure, the above-described processing steps are the most rational as the adhesion technique. Accordingly, the adhesion is usually performed in accordance with processing steps that are substantially similar to the above-described processing steps.

In the structure of the comparison example, as illustrated in FIG. 3A, there exists the following possibility: Namely, because of causes such as a shift of the holding position of the optical element 1, and a rattle of the jig used, the bring-in route is deviated in the direction in which the optical element 1 comes nearer to the adhesive agents 4. As a result, the adhesive agents 4 are whittled and dropped off, and the adhesive agents 4 adhere onto an unintended position. This undesirable situation becomes the cause for occurrences of the following adhesion failures, for example: A lack of the adhesive agent indicated by the dashed-line circle A in FIG. 3B, and an overflow of the adhesive agent indicated by the dashed-line circle B in FIG. 3B. Because of these adhesion failures, there exists a possibility of bringing about the occurrence of the problem of the position shift and angle shift of the optical element 1. In particular, in the optical pickup, the configuration components are small-sized. As a result, even if there occurs the bring-in deviation of only a few micrometer order, there exists the possibility of bringing about the occurrence of the above-described problem.

In order to solve this problem, in the present embodiment, the protrusion portion 2 illustrated in FIGS. 4A and 4B is set up.

As indicated by the dashed lines in FIGS. 4A and 4B, the front end of the protrusion portion 2 is so deployed as to protrude than the surfaces of the adhesive agents 4 in the direction away from the wall surfaces 10a. On account of this deployment of the protrusion portion 2, the optical element 1 comes into contact with the protrusion portion 2 earlier than the adhesive agents 4. This desirable situation successfully occurs, even if, during the bring-in operation of the optical element 1, the bring-in deviation occurs in the direction in which the optical element 1 comes nearer to the adhesive agents 4. This feature makes it possible to prevent the unintended adherence of the adhesive agents 4.

Next, referring to FIG. 5 and FIG. 6, the explanation will be given below concerning effective configurations of the optical-element holding unit 50.

Figure 5:
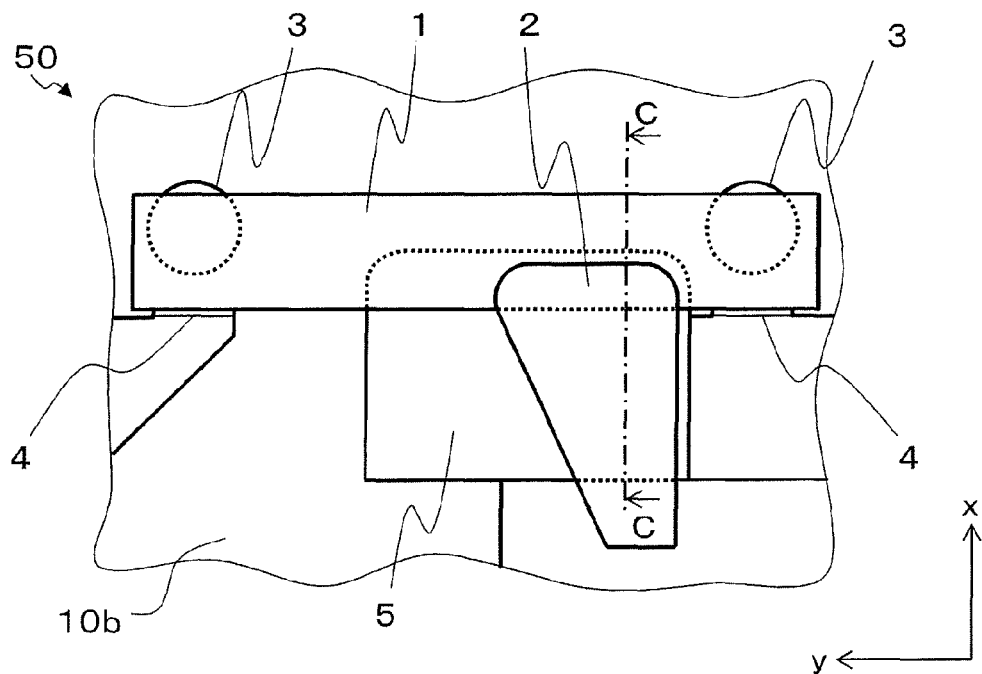
FIG. 5 is a top view where the optical-element holding unit 50 included in the optical pickup 100 according to the first embodiment is seen from the z direction.
Figure 6:
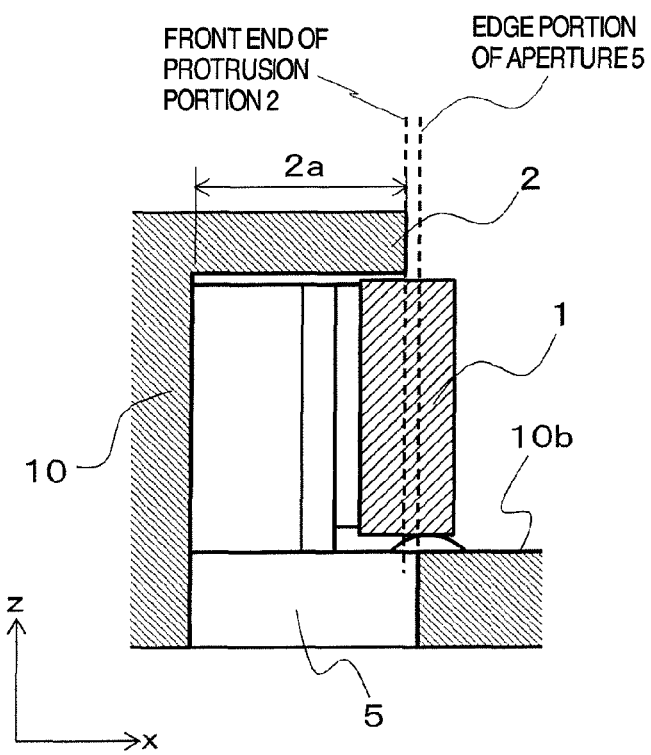
FIG. 6 is a cross-sectional view for illustrating the C-C cross section of the optical-element holding unit 50 illustrated in FIG. 5.

FIG. 5 is a top view where the optical-element holding unit 50 included in the optical pickup according to the present embodiment is seen from the z direction. FIG. 6 is a cross-sectional view for illustrating the C-C cross section of the optical-element holding unit 50 illustrated in FIG. 5.

As illustrated in FIG. 5, when seen from the z direction, the protrusion portion 2 is deployed between the two locations of adhesive agents 4. On account of this deployment, when seen from the z direction, areas above the adhesive agents 4 are liberated. Namely, the protrusion portion 2 does not exist above the adhesive agents 4. Accordingly, when predetermined positions are coated with the adhesive agents 4, it is possible to prevent the protrusion portion 2 from obstructing this coating.

Also, below the protrusion portion 2, an aperture 5 is formed in the bottom surface 10b on which the position-determining convex portions 3 of the housing 10 are provided.

When seen from the direction perpendicular to the bottom surface 10b (i.e., z direction), the aperture 5 is so formed as to become a wider region than a portion 2a of the protrusion portion 2 that protrudes in the direction parallel to the bottom surface 10b (i.e., the portion that protrudes in the in-xy-plane direction). When the aperture 5 is seen from the C-C cross section illustrated in FIG. 6, the aperture 5 becomes wider than the portion 2a of the protrusion portion 2 in the direction away from the wall surfaces 10a. On account of this structure, when the housing 10 is formed by the mold-formation, the punch-out can be performed in the z direction.

Here, the optical element 1 exemplified in the present embodiment is a rectangular parallelepiped. A partial portion of the optical element 1, however, may also be equipped with geometrical forms such as spherical surface, notch, chamfering, and hole. Also, each surface is not required to be a complete plane, and surfaces opposed to each other are not required to be completely parallel to each other. In this case, surfaces that are the closest to the earlier-described position relationship are selected as the upper surface, lower surface, front surface, and back surface.

Next, referring to FIG. 7 and FIG. 8, the explanation will be given below regarding a second embodiment of the optical pickup of the present invention.

Figure 7:
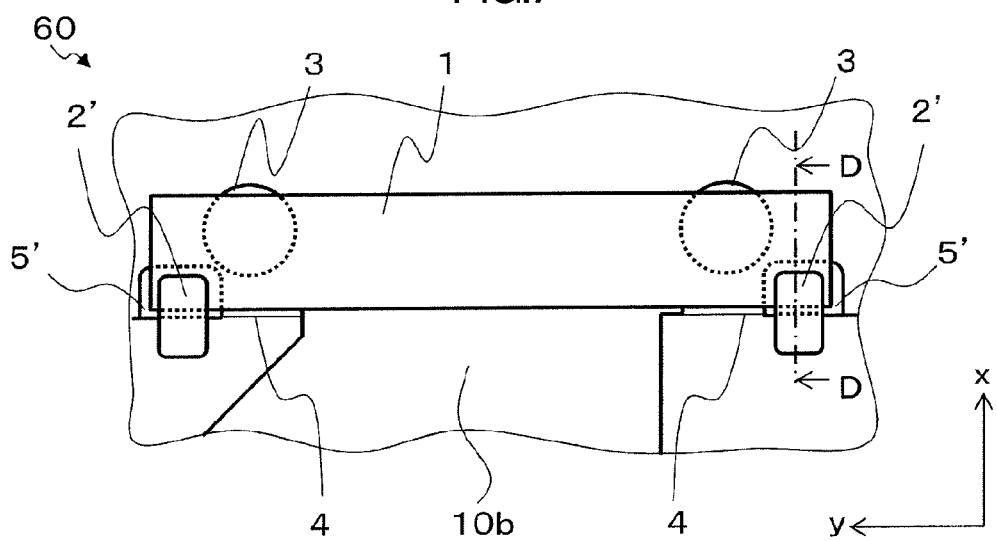
FIG. 7 is a top view where an optical-element holding unit 60 included in an optical pickup according to a second embodiment is seen from the z direction.
Figure 8:
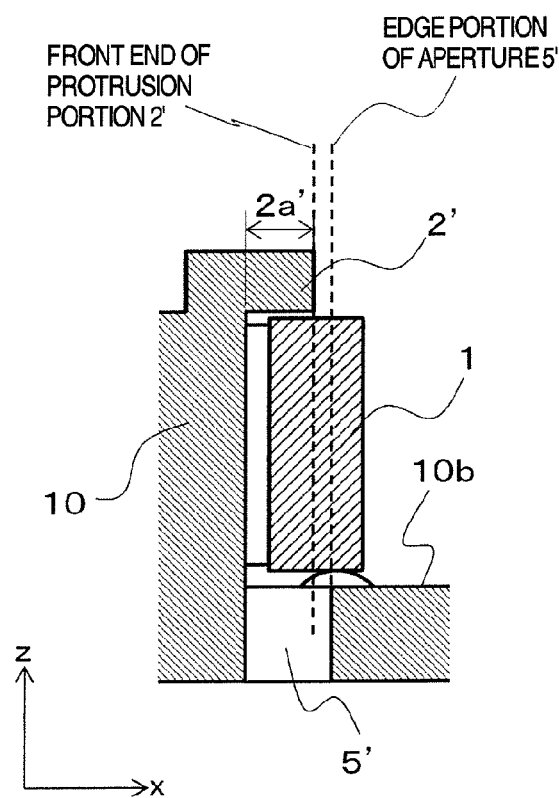
FIG. 8 is a cross-sectional view for illustrating the D-D cross section of the optical-element holding unit 60 illustrated in FIG. 7.

FIG. 7 is a top view where an optical-element holding unit 60 included in the optical pickup according to the present embodiment is seen from the z direction. FIG. 8 is a cross-sectional view for illustrating the D-D cross section of the optical-element holding unit 60 illustrated in FIG. 7.

In the present embodiment, protrusion portions 2' that are opposed to the upper surface 1a of the optical element 1 are set up on both sides of the optical element 1 in the y direction. These protrusion portions 2' are so deployed as to protrude than the adhesive agents 4 in the direction away from the wall surfaces 10a. Also, as is the case with the protrusion portion 2 in the first embodiment, these protrusion portions 2' are deployed at the positions where these protrusion portions 2' do not conceal the adhesive agents 4. Also, below each of the protrusion portions 2', each of apertures 5' is formed in the bottom surface 10b of the housing 10. When seen from the direction perpendicular to the bottom surface 10b (i.e., z direction), each aperture 5' is so formed as to become a wider region than a portion 2a' of each protrusion portion 2' that protrudes in the direction parallel to the bottom surface 10b (i.e., the portion that protrudes in the in-xy-plane direction). When each aperture 5' is seen from the D-D cross section illustrated in FIG. 8, each aperture 5' becomes wider than the portion 2a' of each protrusion portion 2' in the direction away from the wall surfaces 10a. On account of this structure, an effect similar to the one in the first embodiment can be accomplished. In addition thereto, each protrusion portion 2' is deployed outside the two locations of adhesive agents 4. This deployment of each protrusion portion 2' makes it possible to prevent the unintended adherence of the adhesive agents 4, even if a rotation deviation around the z axis occurs during the bring-in operation of the optical element 1.

In this way, within the range where the above-described deployment conditions are satisfied, the protrusion portion may be set up at whatever location, or plural units of protrusion portions may be set up. Also, the position-determining convex portions 3 that are in contact with the optical element 1 are provided on the bottom surface 10b that is orthogonal to the wall surfaces 10a of the housing 10. The position-determining convex portions 3, however, are not necessarily required to be provided on the bottom surface 10b.

Incidentally, the present invention is not limited to the above-described embodiments, but includes a variety of modified examples. For example, the detailed explanation has been given concerning the above-described embodiments in order to explain the present invention in an easy-to-understand manner. Namely, the embodiments are not necessarily limited to the ones that include all of the configurations explained. Also, a partial portion of the configuration of a certain embodiment can be replaced by the configuration of another embodiment. Also, the configuration of another embodiment can be added to the configuration of a certain embodiment. Also, the addition, deletion, and replacement of another configuration can be applied to a partial portion of the configuration of each embodiment.

Also, the configuration components which are conceivable as being necessary from the explanation's point-of-view are indicated as each configuration component of the optical pickup 100. Namely, all of the configuration components are not always indicated.

The invention claimed is:

1. An optical pickup, comprising:
   a housing;
   an optical element mounted on said housing by fixing onto wall surfaces of said housing via adhesive agents on both ends of a certain single surface of said optical element;
   an objective lens for focusing light onto an optical disc to be mounted; and
   a protrusion portion protruding orthogonal from said wall surfaces toward the optical element, the protrusion portion being positioned between said wall surfaces; wherein,
   the objective lens for focusing light to the optical disc from an upper side thereof, and a reverse side is defined as a lower side thereof;
   convex portions in contact with a lower side surface of the optical element are formed on a bottom surface of the housing which is orthogonal to said wall surfaces of the housing;
   the protrusion portion protruding from the housing is disposed at a position which is opposed to an upper surface of the optical element; and
   a front end of said protrusion portion protrudes more than said adhesive agents in a direction away from said wall surfaces.

2. The optical pickup according to claim 1, wherein, when said certain single surface is defined as a bottom surface, said certain single surface being orthogonal to said wall surfaces of said housing, said protrusion portion is deployed between said adhesive agents on both sides, when seen from a direction perpendicular to said bottom surface.

3. The optical pickup according to claim 1, wherein, when said certain single surface is defined as a bottom surface, said certain single surface being orthogonal to said wall surfaces of said housing, said protrusion portion is deployed outside each of said adhesive agents on both sides, when seen from said direction perpendicular to said bottom surface.

4. The optical pickup according to claim 1, wherein, when said certain single surface is defined as a bottom surface, said certain single surface being orthogonal to said wall surfaces of said housing, an aperture is provided in said bottom surface that is positioned below said protrusion portion, said aperture being of a shape in which, when seen perpendicularly from said bottom surface, said aperture becomes a wider region than a portion of said protrusion portion that protrudes in a direction parallel to said bottom surface.

5. The optical pickup according to claim 1, wherein a surface of the protrusion portion is configured to protrude over said wall surfaces of said housing in a direction away from said wall surfaces to which adhesive agents are applied.

* * * * *